Aug. 20, 1963     E. J. BEVERS ETAL     3,100,964
WATER INJECTION SYSTEM FOR A MULTISTAGE COMPRESSOR
Filed Nov. 25, 1959
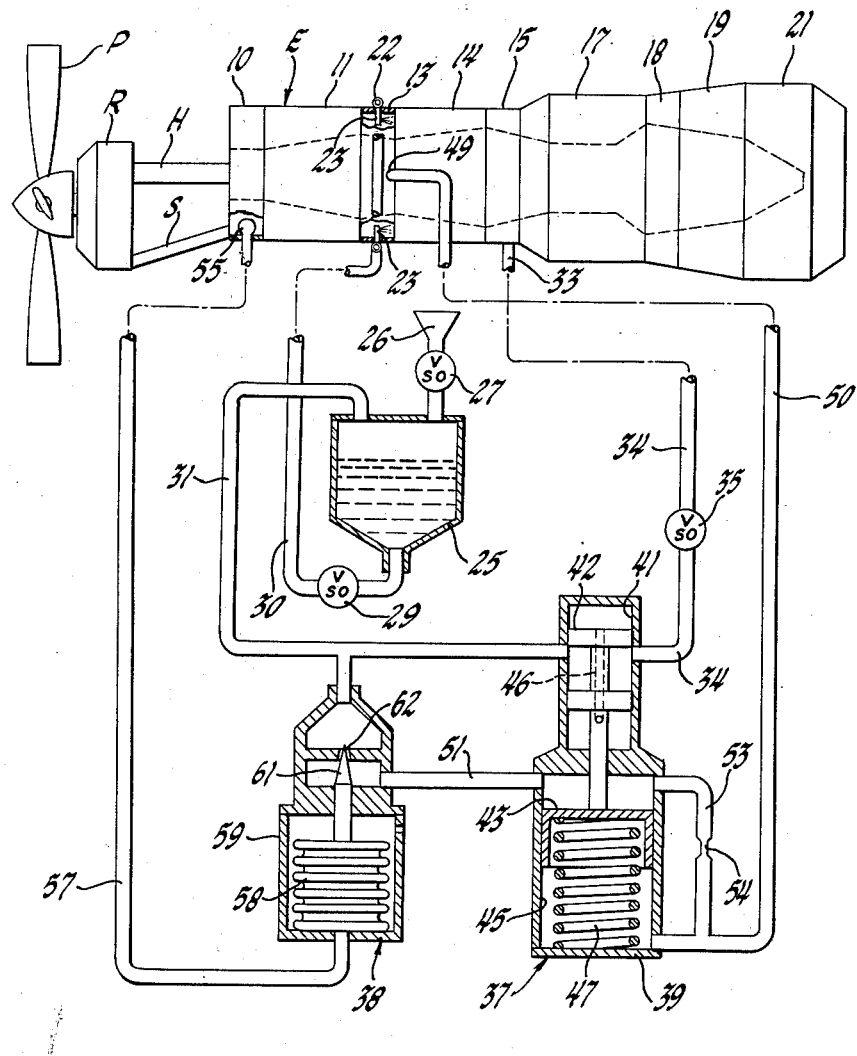
INVENTORS
Eugene J. Bevers &
BY Robert J. Wente
Paul Fitzpatrick
ATTORNEY

3,100,964
WATER INJECTION SYSTEM FOR A MULTISTAGE COMPRESSOR

Eugene J. Bevers and Robert J. Wente, Indianapolis, Ind., assignors to General Motors Corporation, Detroit, Mich., a corporation of Delaware
Filed Nov. 25, 1959, Ser. No. 855,353
7 Claims. (Cl. 60—39.3)

Our invention is directed to an improved system for injecting water or other cooling liquids into the compressor of a gas turbine engine to augment the power of the engine. The invention is particularly applicable to aircraft engines of either the shaft power output or jet type.

It has long been realized that the effective power output (either thrust or shaft power) of a gas turbine may be increased by spraying liquid into the compressor, and numerous arrangements for this purpose have been proposed. The addition of the liquid cools the air by evaporation of the liquid, providing more efficient compression and permitting supply of additional fuel to the engine because of the low temperature of the air delivered by the compressor. The resulting augmentation of power is particularly beneficial for takeoff of an aircraft in hot weather; also from high altitude landing fields, or with unusually heavy takeoff loading.

The liquids used for thrust augmentation have generally been a mixture of water and alcohol, the alcohol serving to prevent freezing of the water and also liberating some energy by combustion. Ammonia water has also been proposed for such augmentation.

The system of our invention is designed particularly for use of pure water for cooling, which is necessary in installations in which air is bled from the engine and supplied to the aircraft cabin for pressurization or air conditioning. In this case, alcohol or ammonia vapors would be intolerable.

Therefore, our system is so constituted that the system empties and purges itself of water during takeoff and initial climb so that there is no water left in the system to freeze at high altitudes. The requisite amount of water to provide power augmentation during takeoff is supplied to a reservoir or tank before takeoff, and the entire quantity is used and the water system is purged by compressed air before the beginning of high altitude flight. Our system also involves improved water supply and control arrangements which, of themselves, are capable of use for injection of other augmenting liquids than water where toxicity of the vapors is not objectionable.

The nature of our invention and the advantages thereof will be apparent to those skilled in the art from the succeeding detailed description of the preferred embodiment thereof and the accompanying drawing, which is a schematic diagram of the preferred augmenting installation.

Referring to the drawing, the invention is illustrated as applied to a turboprop aircraft engine of known type wherein it serves to increase temporarily the shaft horsepower of the engine. The invention may be applied in the same way to a turbojet engine to increase the thrust of the engine. The power plant illustrated in FIGURE 1 comprises a gas turbine engine E which drives a propeller P. The propeller is mounted on and driven by a reduction gear R driven by the engine through a shaft contained in a housing H. The reduction gear is also coupled to the engine by struts S.

The engine E comprises in sequential order an air inlet housing 10, a low pressure compressor 11, an inter-compressor frame 13, a high pressure compressor 14, a midframe or diffuser section 15, a combustion section 17, a high pressure turbine 18, a low pressure turbine 19, and an exhaust duct 21. In the engine illustrated the high pressure turbine drives the high pressure compressor and the low pressure turbine drives the low pressure compressor and the propeller. The arrangements for supplying fuel to the engine and controlling its operation are not illustrated. It may be noted that while an engine of the two-spool type is illustrated, the invention is applicable also to single-spool engines.

In the two-spool engine the water is preferably injected into the air stream at the inter-compressor frame 13. The injecting structure may be of any suitable type and may comprise an annular water manifold 22 supplying a number of spray tubes 23 extending into the air duct.

The water for thrust augmentation is contained in a tank 25 provided with a conduit 26 for filling the tank, which conduit embodies any suitable shut-off means indicated by the valve 27. Water is supplied from the tank to the manifold 22 through a shut-off valve 29 and a water delivery duct 30. The water is ejected from the tank into the engine by compressed air supplied to the tank through a compressed air delivery conduit 31. The source of the compressed air is a later stage of the compressor than that into which the water is injected. Preferably, the air is supplied by an air bleed 33 in the compressor outlet frame 15 which connects to a compressed air supply conduit 34 in which a shutoff valve 35 is provided.

The rate of supply of the water is controlled by varying the pressure differential between the air in conduit 31 and the pressure of the air flowing through the compressor at the point where the water is injected. This is accomplished primarily by a pressure regulating valve 37 which connects the conduits 34 and 31 and throttles the air flow from conduit 34 into conduit 31. The rate of water supply is also preferably modulated by a temperature compensating valve 38 which modifies the action of regulating valve 37 in response to temperature of the air entering the compressor. The reason for this temperature modulation is that the need for power augmentation increases as the air temperature increases. By providing the temperature compensation, the augmenting system may be calibrated to increase the water supply with increase in air temperature so as to retain the rated power output of the engine notwithstanding increases in ambient temperature.

Considering first the pressure regulating valve 37, this may embody any suitable structure to accomplish the desired result. The valve 37 as illustrated comprises a housing 39 defining a valve cylinder 41 in which a valve spool 42 is reciprocable. Valve spool 42 includes a stem fixed to a piston 43 reciprocable in a second cylinder 45. It will be noted that spool 42 provides a pressure balanced valve and that as the valve moves downward as illustrated in the drawing the upper land of the valve spool throttles the ports in cylinder 41 which connect lines 34 and 31 to the cylinder. A bleed passage 46 may be provided through the spool to prevent trapping water in the ends of the cylinder. The piston 43 is biased by a compression spring 47 in the direction to open valve 37 and thereby increase the pressure in line 31. It is biased in the opening direction also by air tapped from the inter-compressor frame 13 by a pressure probe 49 which connects through a conduit 50 with the lower end of cylinder 45. Valve 37 is biased in the closing direction by the air pressure in delivery conduit 31 which is communicated to it through temperature compensating valve 38 and the line 51 entering the upper end of cylinder 45. It will be understood that if the temperature compensating feature is not provided line 51 is connected directly to conduit 31 so that the pressure difference between the air in line 31, and therefore of the water in tank 35, and the compressor air pressure at the point of injection of the water will be a substantially constant value determined by the force of spring 47 and the area of piston 43. In this case, the rate of flow of water will be constant notwithstanding variations in the actual pressure at the point of injection since such variation is compensated for by the pressure regulating valve.

While not necessary, it is highly desirable to include the temperature compensating feature of the invention. When this is included, the valve 38 is provided and also a bleed passage 53 having a restriction 54 is provided between the two ends of cylinder 45. The valve 38 is controlled by a temperature sense which responds to the air temperature in the compressor, preferably in the air inlet section 10. For this purpose, a temperature bulb or capsule 55 mounted in the engine air inlet 10 is connected through a pressure line 57 to an expansible bellows 58 mounted in the housing 59 of valve 38. Bellows 58 controls a tapered or contoured needle 61 which varies an orifice 62. The chamber at one side of orifice 62 is connected to the air delivery conduit 31 and the chamber at the other side of the orifice is connected through line 51 to the pressure regulating valve.

The temperature compensating valve 38 modifies the operation of the pressure regulating valve 37 as follows: The pressure below piston 43 is always the actual pressure picked off by probe 49. The pressure above piston 43 is varied by the valve needle 61 and is thus some value intermediate the pressure in line 31 and the pressure at probe 49. The relation of the pressure above piston 43 to that below piston 43 is a function of the relative sizes of orifices 62 and 54. As temperature of the entering air increases, the expansion of bellows 58 closes orifice 62, thereby reducing the pressure above piston 43 and allowing the pressure in line 50 and spring 47 to increase the opening of valve 37 to increase the pressure in line 31 and thereby increase the rate of flow of water. By properly contouring needle 62, the rate of flow of water may be modified so as to bring the power output of the engine to the standard day rating by compensating for the decrease in power of the unaugmented engine due to the increase in air temperature above the standard temperature.

The operation of the system may be described briefly. Before takeoff, the tank 25 is entirely or partially filled with water to provide sufficient water to last through the takeoff, and valve 27 is closed so that the tank is capable of being pressurized. Before the engine is started, valve 35 or valve 29 is closed so that the system is out of operation. Just before the takeoff run is begun valves 29 and 35 are opened so that the compressed air forces the water from tank 25 through spray bars 23 into the air flowing through the compressor. This cools the air and makes it possible to supply additional fuel to the engine. In fact, the usual fuel controls of such engines will automatically increase the fuel in response to the lowering of the air temperature. Valves 29 and 35 are left open until all of the water has been forced from tank 25, line 30 and the spray bars into the engine. As soon as the pilot is assured that the system has had time to purge itself, the valve 35 or 29 may be closed to prevent any unnecessary bleeding of air and return of the air to the earlier stage of the compressor.

While valves are shown in both the air supply line and the water duct, it will be apparent that the system can be shut off and activated by either of valves 29 or 35, and that one of these valves may be omitted in some cases. Of course, if tank 25 is above the engine, valve 29 is needed to prevent dribbling of the water; and whether or not this valve is provided, valve 35 may be desirable in a practical installation.

The means of operation of these valves is immaterial, but they may conveniently be solenoid-opened valves concurrently energized by an electrical circuit controlled by the pilot. Valve 27 could, of course, be any suitable closure such as a sealing cap on the filler line 26.

The advantages of the system in providing a simple, effective system for accurate compensation for loss of power due to high ambient temperatures will be apparent. Because of the mode of operation of the system and its self-purging capacity, it is adapted to the use of pure water, although the system can handle toxic fluids as readily as water where the use of such fluids is permissible.

The detailed description of the preferred embodiment of the invention for the purpose of explaining the principles thereof is not to be considered as limiting or restricting the invention, since many modifications may be made by the exercise of skill in the art within the scope of the invention.

We claim:

1. A system for injecting a cooling fluid into a multistage compressor comprising, in combination, a closed tank for the fluid, a duct connecting the tank to a stage of the compressor for delivering the fluid thereto, a compressed air delivery conduit connected to the tank for forcing the fluid from the tank, a compressed air supply conduit connected to a higher pressure stage of the compressor than the said duct, a pressure regulating valve connecting the said conduits, and means responsive to pressure in the first-mentioned stage connected to the regulating valve operative to maintain a predetermined pressure differential between the air in the delivery conduit and the first-mentioned stage.

2. A system as recited in claim 1 in which the cooling fluid is water.

3. A system as recited in claim 2 in which the duct leads from the bottom of the tank so that the compressed air supplied to the tank purges the system of water.

4. A system for injecting a cooling fluid into a multistage compressor comprising, in combination, a closed tank for the fluid, a duct connecting the tank to a stage of the compressor for delivering the fluid thereto, a compressed air delivery conduit connected to the tank for forcing the fluid from the tank, a compressed air supply conduit connected to a higher pressure stage of the compressor than the said duct, a pressure regulating valve connecting the said conduits, means responsive to pressure in the first-mentioned stage connected to the regulating valve operative to maintain a predetermined pressure differential between the air in the delivery conduit and the first-mentioned stage, and means responsive to the temperature of air flowing through the compressor connected to the regulating valve so as to increase the said pressure differential with increase in temperature of the said flowing air.

5. A system as recited in claim 4 in which the cooling fluid is water.

6. A system for injecting a cooling fluid into a multistage compressor comprising, in combination, a closed tank for the fluid, a duct connecting the tank to a stage of the compressor for delivering the fluid thereto, a compressed air delivery conduit connected to the tank for forcing the fluid from the tank, a compressed air supply conduit connected to a higher pressure stage of the compressor than the said duct, a pressure regulating valve connecting the said conduits, means transmitting the pressure in the first-mentioned stage to the regulating valve, the regulating valve being operative to maintain a predetermined pressure differential between the air in the delivery conduit and the first-mentioned stage pressure, and means responsive to the temperature of air flowing through the compressor connected to the regulating valve effective to modulate the first-mentioned stage pressure transmitted to the regulating valve so as to increase the said pressure differential with increase in temperature of the said flowing air.

7. A system as recited in claim 6 in which the cooling fluid is water.

References Cited in the file of this patent

UNITED STATES PATENTS

| | | |
|---|---|---|
| 2,641,105 | Drake | June 9, 1953 |
| 2,686,631 | Jordan | Aug. 17, 1954 |
| 2,863,282 | Torell | Dec. 9, 1958 |
| 2,952,974 | Wright | Sept. 20, 1960 |
| 2,974,482 | Kelley | Mar. 14, 1961 |

OTHER REFERENCES

"Hydrogen Peroxide Injection Boosts Jet Thrust 120%," Aviation Age, June 1958, page 54.